United States Patent [19]

Coffman

[11] Patent Number: 4,597,772
[45] Date of Patent: Jul. 1, 1986

[54] FIXED KILN WITH ROTOR STEAM GASIFIER

[75] Inventor: John A. Coffman, Ballston Spa, N.Y.

[73] Assignee: Wright-Malta Corporation, Ballston Spa, N.Y.

[21] Appl. No.: 652,481

[22] Filed: Sep. 20, 1984

[51] Int. Cl.[4] ............................................. C10J 3/00
[52] U.S. Cl. ........................................ 48/111; 48/78; 48/85; 48/112; 48/DIG. 3; 201/33; 201/38; 202/118; 202/128; 202/131; 110/276
[58] Field of Search .................. 48/111, 85, 78, 122, 48/DIG. 3; 201/32, 33, 38; 202/118, 131, 128, 129; 110/275, 276

[56] References Cited

U.S. PATENT DOCUMENTS 2,966,215 12/1960 Durkee ............................ 202/118 X
4,308,103 12/1981 Rotter ................................ 48/111 X

*Primary Examiner*—Arthur Kellogg
*Attorney, Agent, or Firm*—Charles W. Helzer

[57] ABSTRACT

A tilted, fixed kiln with rotory steam gasifier having a fixed elongated, pressurizable kiln body member with an input end and an output end and with the center axis supported at an angle to the horizontal so as to bring into effect gravitational forces acting on high moisture content biomass material fed into the input end and travelling through the kiln to the output end and having in the kiln body an axially extending rotor and a motor, radially spaced-apart scoop-like blade elements extending along the axial length of the kiln for tumbling the material, means for increasing the temperature from its input to its output end, spaced-apart blades and chains disposed in the rotor kiln cavities for stirring the biomass material as it travels through the kiln to prevent agglomeration, a plurality of parallel, axially extending hot gas counter-flow feedback pipes arranged around the kiln body and along the backsides of the scoop-like blade elements, a metering auger mounted vertically to the input end of the kiln to assure continuous flow of the biomass into the kiln, and dam-like baffles mounted within the kiln body to increase the volume held in the kiln.

34 Claims, 13 Drawing Figures

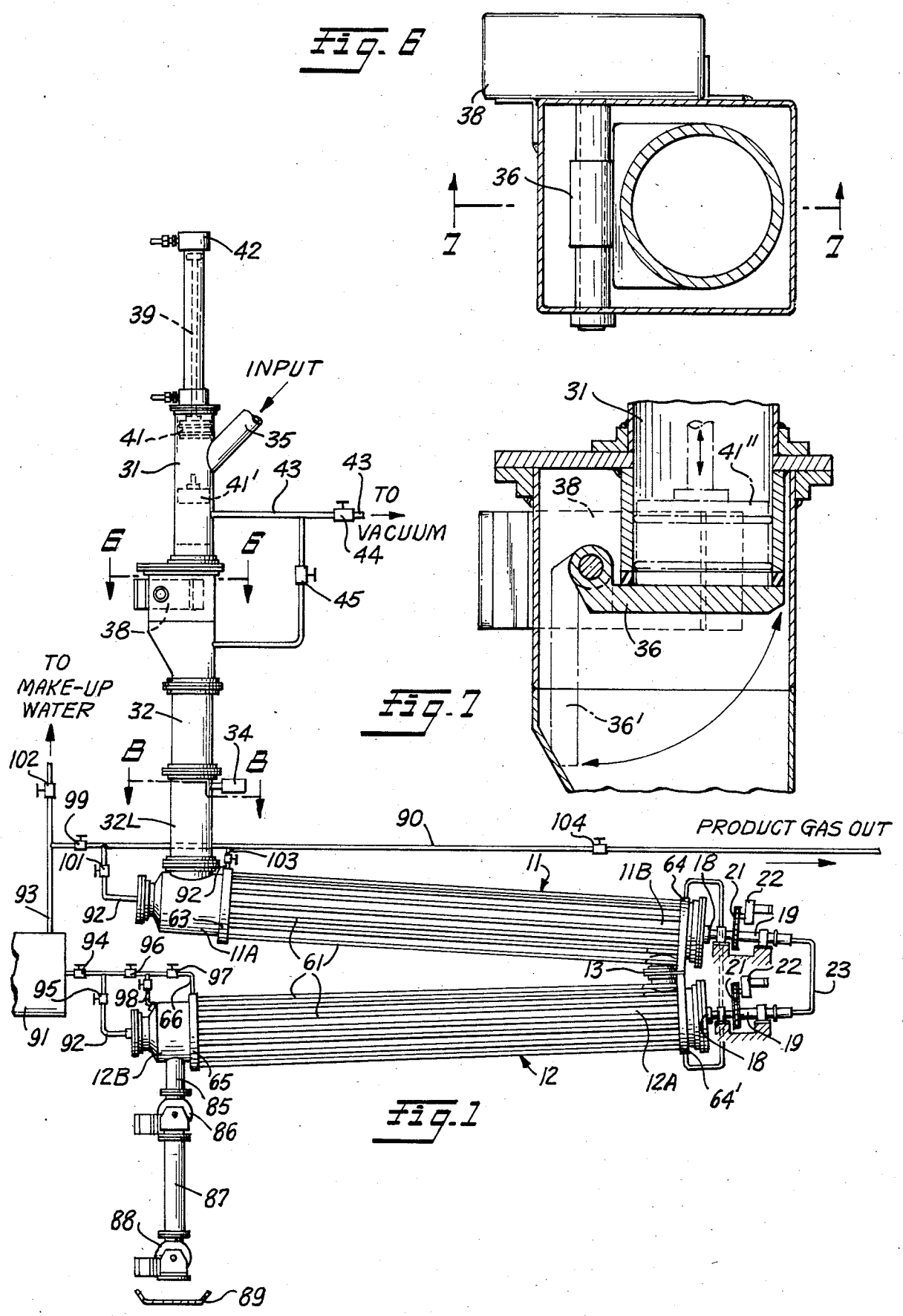

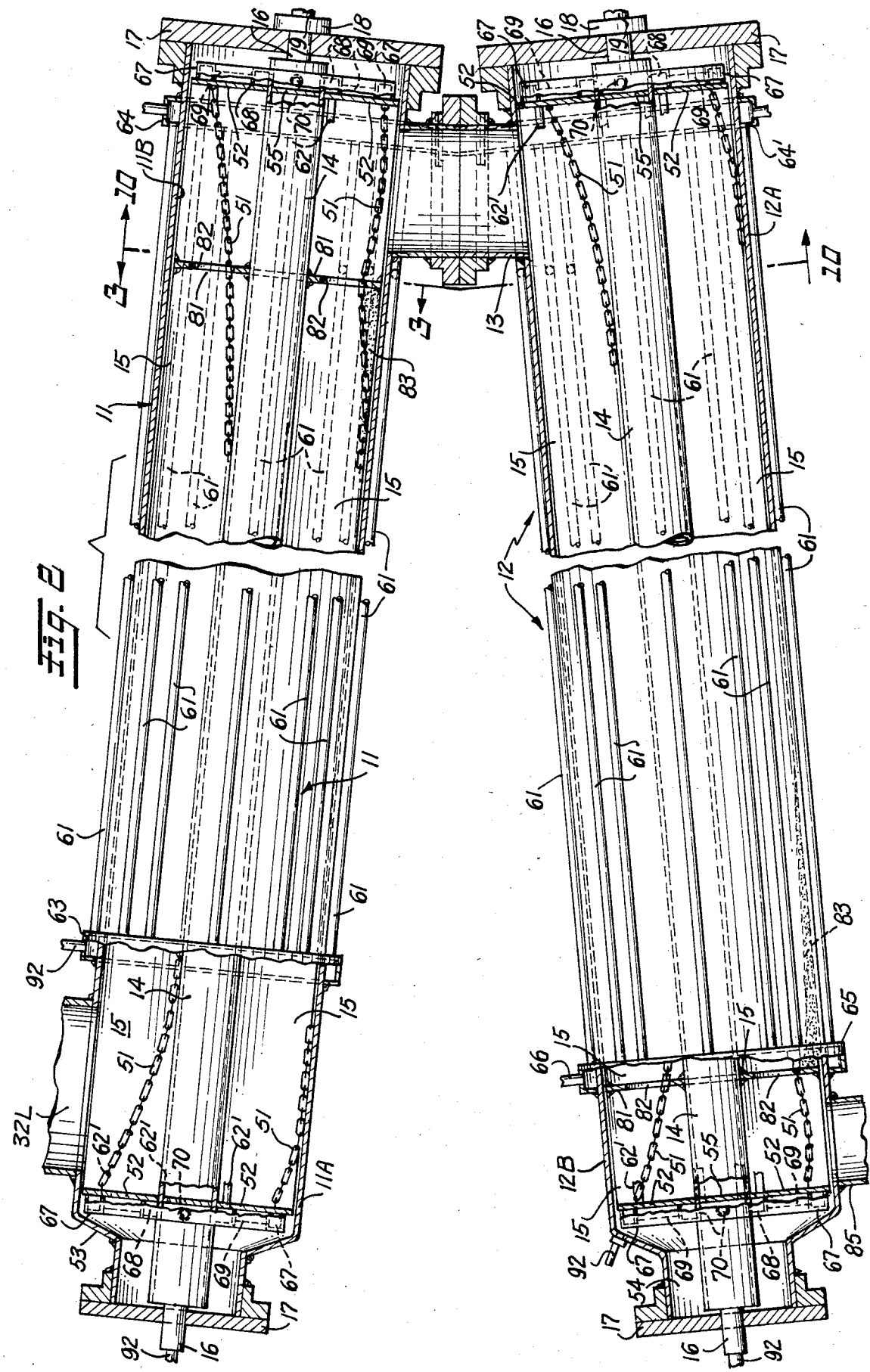

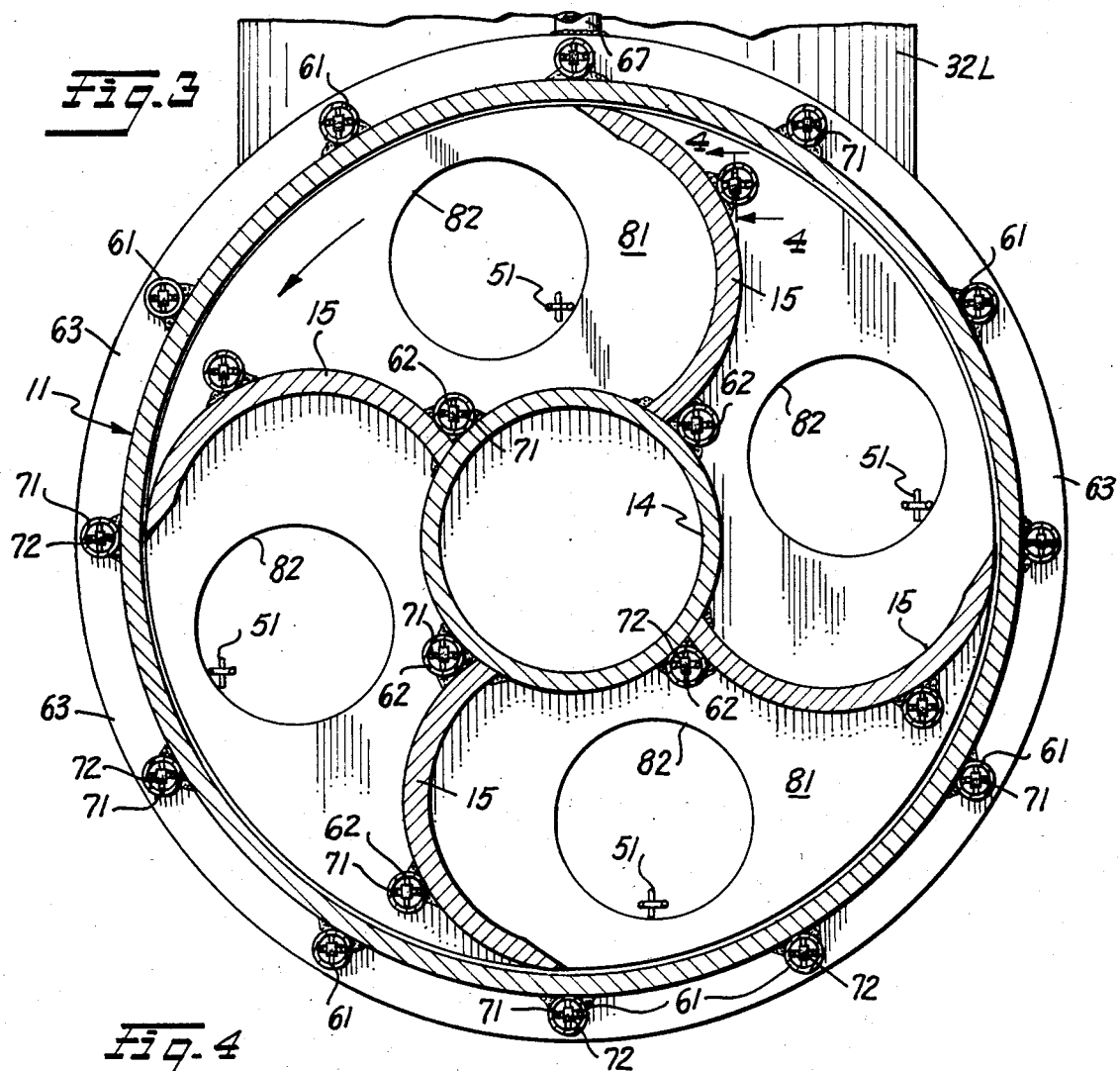
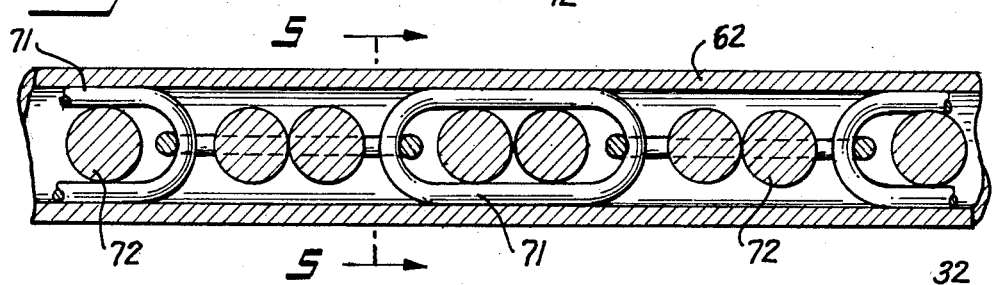
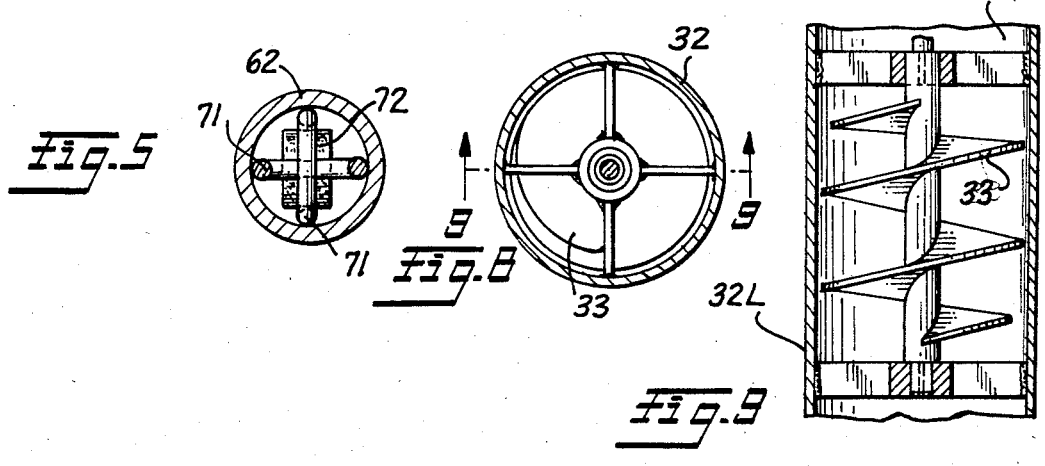

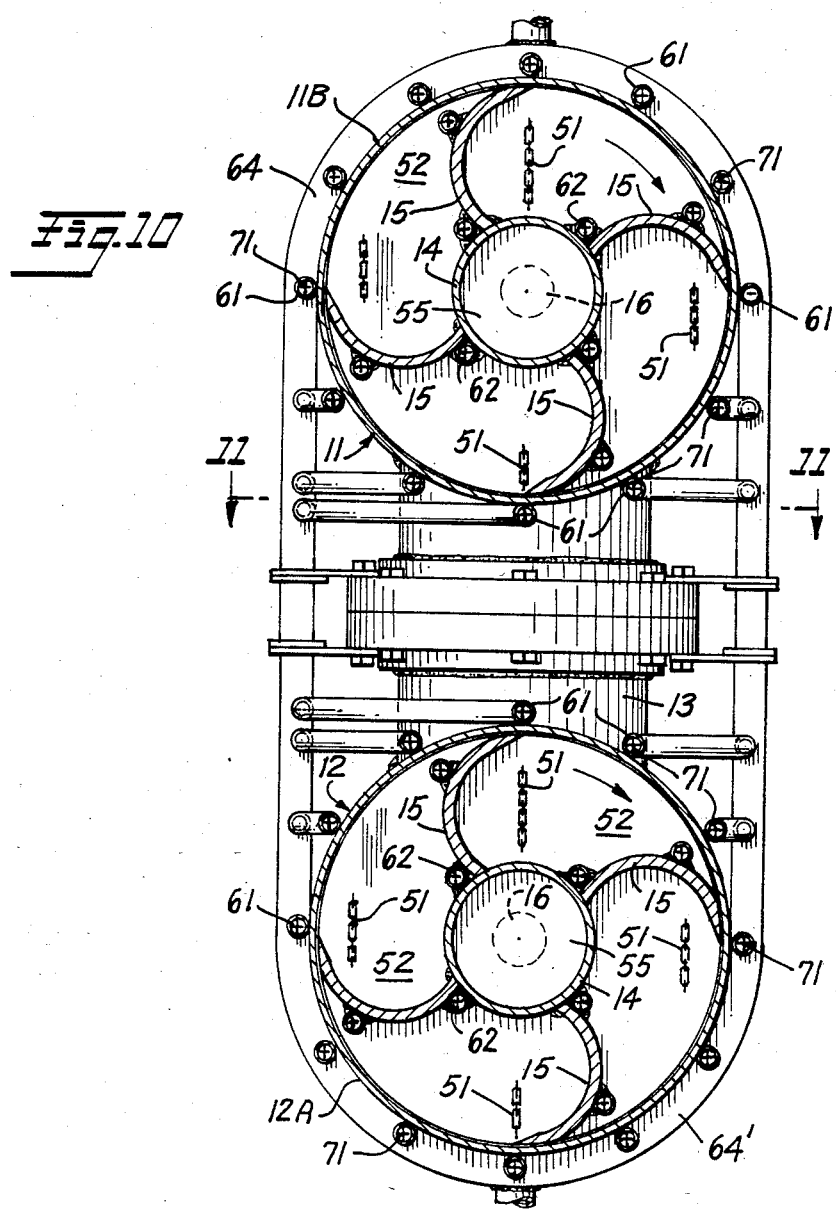
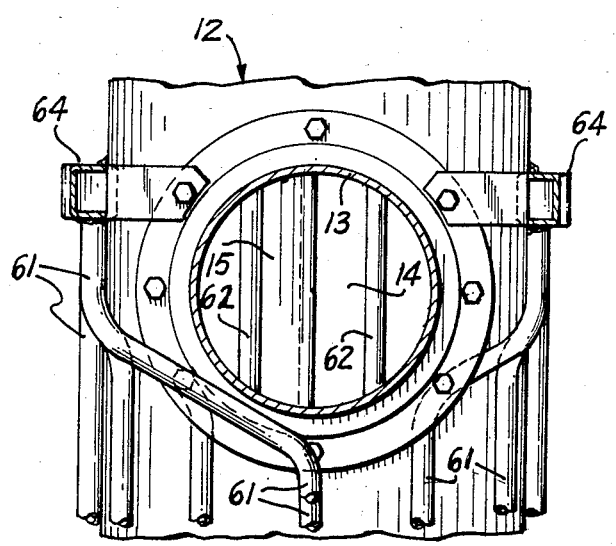

FIXED KILN WITH ROTOR STEAM GASIFIER

TECHNICAL FIELD

This invention relates to an improved apparatus for the thermo-chemical conversion of high moisture content pyrolyzable materials having high organic content such as solid waste, paper, wood pulp, sawdust, wood chips, coal to which water has been added, and the like (hereinafter referred to as "biomass material").

More particularly, the invention relates to a new and improved fixed kiln with rotor steam gasifier for the steam gasification of biomass material.

BACKGROUND PRIOR ART

The thermo-chemical conversion by steam treatment of biomass material has been described earlier in a series of articles. One such article appears in the American Chemical Society Symposium Series 76 on Solid Wastes and Residues—Conversion By Advanced Thermal Processes, presented at a meeting of the American Chemical Society at Anaheim, Calif., USA on Mar. 13–17, 1978, in a paper entitled "Power From Wastes Via Steam Gasification" by John A. Coffman and R. H. Hooverman. This was a follow-on report of earlier work described in a paper entitled "Rotory Kiln Gasification of Biomass and Municipal Wastes" presented by John A. Coffman and R. H. Hooverman at a symposium on clean fuels from biomasses and wastes sponsored by the Institute of Gas Technology at Orlando, Fla., USA on Jan. 25–28, 1977. The work on steam gasification reported in these two papers led to a design for a fixed kiln with a rotor in which the steam gasification process is conducted, which was described in a paper presented at the 14th Biomass Thermal Chemical Conversion Contractors meeting held in Arlington, Va., USA on June 23–24, 1982 and published in the Proceedings of that meeting in October 1982.

While the fixed kiln with rotor described in the October 1982 Proceedings of the 14th biomass Chemical Conversion Contractors meeting possessed many desirable characteristics, it nevertheless was not entirely satisfactory due to a number of objectionable characteristics including tendency to compaction and agglomeration of certain biomass material sought to be gasified in the apparatus. In addition, difficulty was encountered in maintaining good thermal conductivity between hot feedback gases in feedback conduits employed to heat the biomass in the apparatus and the hot gas feedback conduits had a tendency to clog. Further, the complexity and cost of the rotor design made the apparatus expensive to manufacture. Additionally, certain types of biomass material required excessively long treatment time in order to obtain satisfactory gasification in a reasonable length apparatus. Lastly, difficulties were encountered in feeding vastly different types of input biomass material into the apparatus in a manner such that compaction and agglomeration both at the input and throughout the apparatus is prevented. To overcome these problems, the present invention was devised.

SUMMARY OF INVENTION

It is therefore a primary object of the present invention to provide a new and improved fixed kiln with rotor steam gasifier apparatus for the steam gasification of biomass material and in which compaction and agglomeration of biomass material being processed is prevented.

Another object of the invention is to provide an improved steam gasifier apparatus of the above type wherein turbulent hot gas feedback flow through hot gas feedback conduits on the apparatus is induced to improve heat transfer between the hot feedback gas and the biomass being produced and helps to maintain the conduits clear and free of blockage and facilitates the periodic mechanical clean-out of such hot gas feedback conduits.

Still another object of the invention is to provide an improved gasifier apparatus having a novel metering auger feed device for feeding different types of input biomass material into the input end of the gasifier apparatus in a manner such that compaction and agglomeration of the biomass material at the input and throughout the steam gasifier is prevented.

A still further object of the invention is to provide an improved gasifier apparatus having the above features and which further includes dam-like baffles for partially damming the flow of biomass material through the apparatus either to increase the volume of biomass held in the kiln and thereby increase the dwell time of the biomass while being treated in a given size gasifier apparatus, or alternately, to increase the throughput of the apparatus.

In practicing the invention a fixed kiln with rotor steam gasifier is provided having a fixed elongated cylindrical, pressurizable kiln body member with an input end and an output end and with the center axis thereof supported at an angle relative to the horizontal so as to bring into effect gravitational forces acting on high moisture content biomass material fed into the input end and travelling to the output end. The fixed kiln with rotor gasifier includes an axially extending rotor rotatably supported within the fixed kiln body member and is provided with means for rotating the rotor at a predetermined rotational speed. The rotor includes radially spaced-apart scoop-like blade elements extending along the axial length of the kiln body member for tumbling the biomass material fed into the rotor kiln as it travels along the axial length of the fixed kiln body member from the input to the output end thereof. Means are provided for heating the interior of the fixed kiln body member to a high temperature with a continuously increasing temperature profile along its axial length from the input end to the output end. Improved means also are provided for introducing the biomass material to be processed into the input end of the fixed kiln body member where it is acted upon by the rotor in a high temperature-high pressure steam atmosphere self-induced in the kiln body member. The scoop-like blade elements of the rotor are radially and axially arrayed relative to one another to define axially extending kiln cavity hollows between the radially spaced-apart blades for receiving and tumbling the biomass material fed into the input end of the kiln body member. At least one stirring and agitating chain-like device is disposed in at least one of the hollows, but preferably in all of the hollows, between the scoop-like blade elements for further agitating and stirring the biomass material as it travels through the kiln body member from the input end to the output end thereof to prevent agglomeration and/or sticking of the biomass material to the side of the kiln or to the scoop-like blade elements.

The means for heating the interior of the fixed kiln body member includes a plurality of substantially parallel, axially extending, hot gas feedback tubular conduits arranged radially around the fixed kiln body member and along the back sides of the scoop-like blade elements of the rotor together with manifold means located at the hot output end of the gasifier for supplying hot steam refined output gas self-produced at the output end of the steam gasifier apparatus into the open ends of the hot gas feedback tubular conduits. This results in producing a feedback counterflow of the hot output gas back through the tubular conduits in a reverse direction relative to the travel of the biomass materials through the gasifier to help maintain the temperature profile throughout the length of the gasifier apparatus.

The means for heating the interior of the fixed kiln body member further includes a hollow rotor shaft for rotatably supporting the blade elements of the rotor and hot gas feedback tubular conduits extending along the convex back side of the scoop-like blade for heating the same. Manifold means are provided for supplying hot steam refined output gas produced at the hot output end of the steam gasifier into the open ends of the tubular feedback conduits mounted on the scoop-like blade elements at the hot output end of the gasifier to thereby further produce an additional feedback counterflow of the output hot gas back through the rotor mounted tubular conduits in a reverse direction relative to the travel of the biomass material through the gasifier. The fixed kiln with rotor gasifier thus comprised is designed to operate in a pressure range of about 200 to 400 pounds per square inch gauge and in a temperature range of about 1100 to 1200 degrees Fahrenheit.

The fixed kiln with rotor steam gasifier apparatus according to the invention further includes a start-up auxiliary steam boiler capable of producing high temperature/high pressure steam together with a network of steam pipes interconnecting the outlet steam from the start-up auxiliary steam boiler to the high temperature outlet end of the fixed kiln body member for initially bringing the kiln body member up to operating temperature and pressure and starting the gasifier process with respect to an initial charge of biomass material supplied to the apparatus. The network of steam pipes also includes product output gas piping and condensate return piping connected to the cool inlet end of the fixed kiln body member for supplying the cooled down product output gas produced by the gasifier to an end user and for feeding condensate back to the auxlary steam boiler together with any make-up water required. Appropriate cut-off and flow control valve means are interconnected in the network of steam, output product gas and condensate return pipes for controlling the process during operation.

To provide larger installations, an enlarged capacity, fixed kiln with rotor steam gasifier system may be provided by interconnecting a plurality of the individual fixed kilns with rotor gasifiers, each constructed according to the preceeding description, and connected in series. Within the system the hot output end of each individual fixed elongated cylindrical, pressurizable kiln body member is connected through a substantial, open interconnecting passageway for supplying unconverted biomass material through the interconnecting passageway to the cool input end of the next succeeding kiln body member in the serially arranged system. As a consequence all of the kiln body members and interconnecting passageways operate at substantially the same pressure and within a continuously increasing temperature profile extending over the length of the entire system of serially connected kiln body members whereby the input end of the first kiln body member is at the coolest point in the system and the output end of the last kiln body member is at the hottest point in the temperature profile of the overall gasifier system thus comprised.

In order to enhance proper operation of the steam gasifier apparatus without compaction or agglomeration of the biomass material being processed, a novel metering auger feed means is mounted on the input end of the input kiln body member for feeding input biomass material into the input end of the kiln body member on a metered, continuous basis whereby properly proportioned spacing of the biomass material in the kiln cavity hollows between the spaced-apart scoop-like blade elements of the rotor is assured together with good exposure of the surfaces of the input biomass to the hot steam atmosphere within the kiln. Additionally it helps to further prevent agglomeration of the input biomass materials at the input and throughout the kiln body member.

Operation of the improved fixed kiln with rotor steam gasifier apparatus is further improved by dam-like baffle means mounted within the kiln body member downstream from the input end thereof with the dam-like baffle means rotating with the rotor and having openings therein aligned with the kiln cavity hollows formed in the spaces between the scoop-like blade elements of the rotor for passage therethrough of the biomass material being processed. The dam-like baffle means define at least one dam in the flow passage of the biomass material through the kiln body member whereby the working volume of the biomass within the kiln is increased and results in either longer dwell time of the biomass within the kiln or increased through-put for a given size steam gasifier apparatus.

BRIEF DESCRIPTION OF DRAWINGS

These and other features and many of the attendant advantages of this invention will be better understood and more fully appreciated upon a reading of the following detailed description when considered in conjunction with the accompanying drawings, wherein like parts in each of the several figures are identified with the same reference character; and wherein:

FIG. 1 is a side elevational view of an improved fixed kiln with rotor steam gasifier apparatus constructed according to the present invention;

FIG. 2 is an enlarged fragmentary elevational view, partly in section, of two, serially connected, fixed, elongated cylindrical, pressurizable kiln body members comprising a part of the improved steam gasifier apparatus according to the invention;

FIG. 3 is an enlarged vertical sectional view taken on line 3—3 of FIG. 2;

FIG. 4 is an enlarged fragmentary longitudinal sectional view taken on line 4—4 of FIG. 3;

FIG. 5 is a transverse sectional view taken on line 5—5 of FIG. 4;

FIG. 6 is an enlarged horizontal sectional view taken on line 6—6 of FIG. 1;

FIG. 7 is a fragmentary vertical sectional view taken on line 7—7 of FIG. 6;

FIG. 8 is an enlarged horizontal sectional view taken on line 8—8 of FIG. 1;

FIG. 9 is a fragmentary vertical sectional view taken on line 9—9 of FIG. 8;

FIG. 10 is vertical sectional view taken on line 10—10 of FIG. 2;

FIG. 11 is a horizontal cross sectional view taken on line 11—11 of FIG. 10.

BEST MODE OF PRACTICING THE INVENTION

Figure 12:
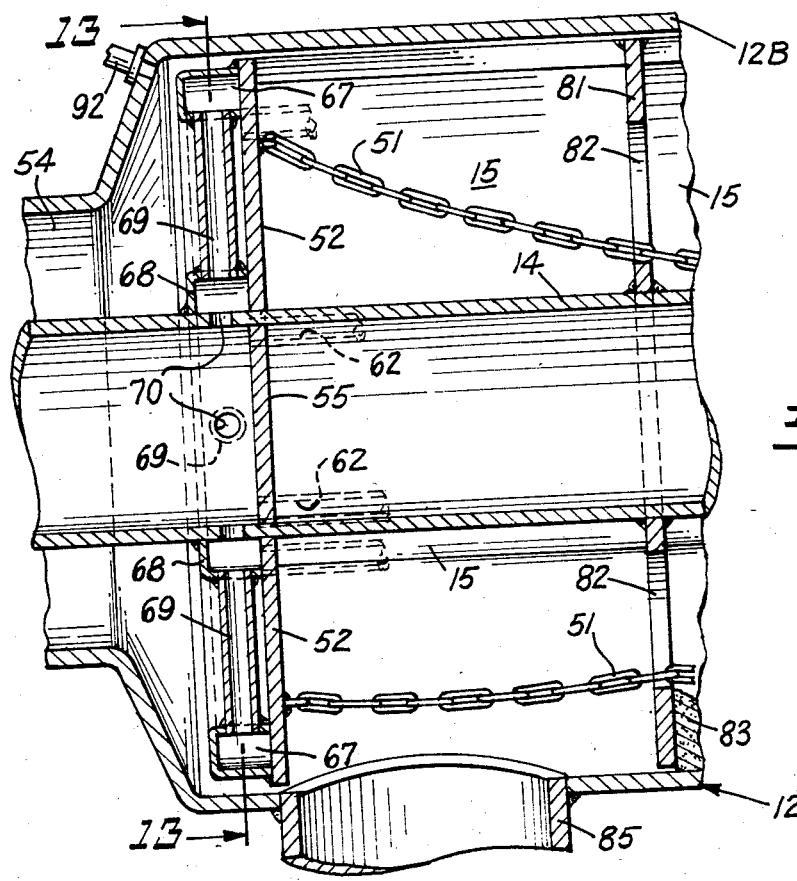
FIG. 12 is an enlarged vertical sectional view of the lower hot gas output end of fixed kiln 12.

FIG. 1 is a side elevational view of an improved, compound, rotor kiln gasifier system constructed according to the invention. In FIG. 1 there is shown two fixed elongated cylindrical, pressurizable kiln body members 11 and 12 which are interconnected by a relatively large diameter, open interconnecting passageway 13. Each of the fixed elongated cylindrical kiln body members 11 and 12 has an input end 11A, 12A and an output end 11B, 12B, respectively, and has the center axis thereof supported at an angle relative to the horizontal so as to bring into effect gravitational forces acting on high moisture content biomass material fed into the input end of the kiln body member and travelling throughout its length to the output end thereof.

As best shown in FIGS. 2 and 3, the gasifier apparatus includes an axially extending rotor formed by the hollow shaft member 14 to which are secured a plurality of radially spaced-apart scoop-like blade elements 15 which extend substantially along the full axial length of the respective kiln body members 11 or 12 for tumbling biomass material fed into the input end of the rotor kiln as the biomass material travels along the axial length of the fixed kiln body member from the input to the output end thereof. The shell 11 or 12, hollow rotor shaft member 14 and blade elements 15 all are constructed of a high temperature, structurally strong, thermally conductive material such as stainless steel, etc., with the blade elements 15 being welded or otherwise secured to the exterior periphery of the hollow shaft member 14. The scoop-like blade elements 15 preferably are relatively simply shaped in the form of an outwardly flaring, U-shaped gutter with the free ends thereof designed to almost scrape the sides of the inner periphery of the outer fixed kiln body members 11 or 12. The ends of the hollow rotor shaft members 14 are secured by spiders (not shown) to hollow stub shafts 16 at each of the ends thereof that in turn are journalled in bearings in end plates 17 that secure and close the respective ends of each of the fixed kiln body members 11 and 12. As best seen in FIG. 1 of the drawings, hubs 18 at the hot output end of kiln 11 and the input end of kiln 12 serve to mechanically couple the hollow rotor shaft members 14 to rotational drive means via reduced diameter hollow shaft members 19, coupling gear drive arrangements 21 and controllable drive motors 22. Motors 22 serve to rotate the respective reduced diameter drive shafts 19 that in turn rotate the hollow rotor drive shaft 14 of kiln body members 11 and 12, respectively. For a purpose to be explained more fully hereafter, the reduced diameter hollow drive shaft members 19 have their free ends interconnected via a hollow tubular conduit 23 as shown in FIG. 1.

Input biomass material is supplied to the input end 11A of the first fixed kiln body member 11 via a metering auger input feed means comprised by a first upper cylinder 31 and a lower feed cylinder 32 in which is mounted a rotatable metering feed auger 33 best seen in FIGS. 8 and 9 of the drawings. The metering feed auger 33 is driven by a motor 34 at a slowly rotating speed as described hereafter. Input biomass material to be processed is periodically supplied through an angled inlet pipe 35 to the upper cylinder 31. Upper cylinder 31 is closed at its bottom end by a motor driven valve member 36 best seen in FIG. 7 of the drawings which serves to seal closed the bottom of the upper cylinder 31 and can be rotated to an open condition indicated by phantom lines at 36' in FIG. 7 by a drive motor 38 whose operation is synchronized as described hereafter. The upper end of cylinder 31 is closed by a hydraulically driven ram 39 having a ram head 41 which is reciprocated up and down within the upper cylinder 31 in the manner shown by the dotted lines 41' in FIG. 1 and 41" in FIG. 7. Hydraulic motors shown at 42 serve to run the ram head 41 downwardly from its solid line position shown in FIG. 1 all the way to the dotted line position shown at 41" in FIG. 7 and then to retract the ram head back to its upper position shown in FIG. 1 during each feed cycle of the metering auger input system to the steam gasifier apparatus.

It is desirable for economic and other design considerations that the input biomass charge supplied through input pipe 35 to the upper cylinder 31 be inserted under atmospheric conditions. It will be recalled however, that the fixed kiln body members 11 and 12 operate at relatively high pressures of the order of 300 pounds per square inch gauge or greater. To accomodate this difference in pressure, it is necessary that the motor driven valve 36 and the ram head 41, which acts as a sealing piston against the interior sides of upper cylinder 31, function in coordination with a synchronized valving system. The valving system is comprised by pipes 43 and stop valves 44 and 45 which are motor driven by motors (not shown) and synchronized in their operation with the up-down movement of ram head 41 and the opening and closing of the lower valve member 36.

In operation, the arrangement is such that with the ram head 41 in its upper position, an input charge of biomass materials to be processed is supplied to the upper cylinder 31 via input pipe 35. At this point, the interior of the upper cylinder will be at atmospheric pressure. The ram head 41 is then run down to an intermediate position shown at 41' in FIG. 1 with the lower valve 36 in its still closed position. The amount of input biomass material is adjusted so that no compaction of the material occurs during this phase of operation. With the system thus conditioned, the valve 45 is closed and valve 44 opened so as to draw off any air that is entrapped in the lower portion of cylinder 31. The opening and closure of the valves 44 and 45 is coordinated with the movement of the ram head 41 and opening and closure of valve member 36 by a central controller (not shown). After evacuation of the lower portion of cylinder 31 below the intermediately positioned ram head 41', valve 44 is closed and valve 45 is opened so as to equalize the pressure in the lower portion of upper cylinder 31 with the pressure in lower cylinder 32 which is at substantially the same pressure as the interior of the fixed kiln body members 11 and 12. After equalization of the pressure in the two cylinders 31 and 32, the lower valve closure member 36 is opened to its dotted line position 36' and the charge of biomass material allowed to drop down into the lower feed cylinder 32.

As best shown in FIGS. 8 and 9 of the drawings, the charge of biomass material inserted into the upper end of the lower cylinder 32 will come to rest on the top of a vertically arranged auger 33 disposed in the lower end 32L of lower cylinder 32. The auger 33 has a total of about one and a half turns, with a downward slope around the outer perimeter of the auger blade of about 35 degrees which is somewhat less than the angle of repose of most biomass material to be processed by the steam gasifier apparatus. The inner surface of the lower cylinder 32L which houses the auger 33 preferably is fluted so as to provide a positive downward thrust to the biomass material being metered by the auger. In operation, the biomass feed materials would be dropped through the valve 36 into the lower cylinder at a frequency of about every three minutes and the auger 33 speed would be set to empty the lower cylinder and the auger itself in slightly less than three minutes. During this same period of time, the rotor 14 and scoop-like blade elements 15 in the fixed kiln body members 11 and 12 will make about twelve revolutions (assuming a rotor speed of 4 rpm), so that the input biomass material being supplied through the metering auger device will be distributed uniformly to the kiln cavity hollows defined by the spaces between the scoop-like blade elements 15 of the rotor. The effect, then, is for the auger 33 to change the intermittent feed through the lock valve 36 into a continuous feed into the kiln body member 11. By thus continuously metering the input feed biomass material, good exposure of the biomass to the hot steam atmosphere within the kiln is assured and compaction and agglomeration of the biomass being processed at the input end of the fixed kiln body member 11 is prevented.

None of the prior art known material feeding devices such as star feeders or vibrating cones provides satisfactory input feeding all of the biomass material listed in part above. Star feeders work nicely for granular solids but jam if used with wood chips. A vibrating cone will move biomass materials at reproducible rates but has to be recalibrated for changes in chip size and dampness. Further, neither the star feeder nor vibrating cone would be able to handle shredded solid waste or run-of-the-mine coal satisfactorily. The novel vertically mounted metering auger feed device described in the preceeding paragraphs provides a unique and satisfactory universal tool for handling solid waste, wood chips, run-of-the-mine coal, and the like all equally well. While horizontal augers in live bottom bins have been used in the past, the use of a vertically mounted auger as a metering flow control device for all types of biomass material in the bottom of an input feed cylinder is new.

In order to further assure proper distribution of the biomass material being processed and to prevent compaction and agglomeration of the material while being tumbled by the rotor blade elements 15 as it travels through the kiln body members 11 and 12, stirring and agitating chain-like elements best seen at 51 in FIGS. 2 and 3 of the drawings, are secured in the kiln cavities or hollow between the scoop-like blade elements 15 substantially along the full length of the kiln body members 11 and 12. The chains 51 are secured by swivel connections to flat, circular, solid end plate members 52 which have their inner peripheries welded to the outer peripheries of each of the hollow shaft rotors 14 at the respective ends thereof as best shown in FIG. 3. The chains 51 are secured to points on the end plate members 52 so as to be disposed in the kiln cavity hollows formed between the scoop-like blade elements 15. The plates 52 rotate with the rotor 14 and also serve to prevent passage of solid material into the end spaces or chambers 53 and 54 of kiln body members 11 and 12, respectively where the output gases produced by the apparatus are accumulated. The outer ends of the plate members 52, however, do not contact or engage the inner peripheral surface of the fixed kiln body members 11 and 12 and are designed to allow for free passage of gas produced by the process from the main body of the kiln into the end spaces or chambers 53 and 54 where the gas accumulates.

During operation, the interior of the fixed kiln body members 11 and 12 are heated to a high temperature of about 1100 to 1200 degrees Fahrenheit with a continuously increasing temperature profile along the axial length from the input end to the output end of each of the kilns. The means for heating the interior of the fixed kiln body members 11 and 12 includes a plurality of substantially parallel, axially extending hot gas feedback tubular conduits 61 which are arranged radially around the fixed kiln body member and extend along the full length thereof. The conduits 61 in fact preferably comprise commercially available cylindrical cross section, steel steam pipes which are welded to the exterior circumference of the fixed kiln body members 11 and 12 in the manner best seen in FIG. 3. The welding filets preferably are quite generous so as to enhance thermal conduction between the hot gas feedback pipes 61 and the cylindrical metallic liner comprising the kiln body members 11 and 12.

In addition to the hot feedback gas tubes 61, a plurality of axially extending hot gas feedback tubular conduits in the form of pipes 62 are secured to the convex backside of each of the scoop-like blade elements 15 and extend along the full length of the scoop-like blade elements. Here again, the conduits 62 comprise commercially available steam pipes which are welded to the back convex side of the scoop-like blade element with generous filets so as to maximize heat transfer to the scoop-like blade elements. This in turn maximizes heat transfer to the biomass material being tumbled by the scoop-like blade elements as the rotor rotates.

Each of the hot gas feedback conduits 61 terminates in manifolds 63 and 64 located at respective opposite ends of the kiln body member 11 and manifolds 64' and 65 located at respective opposite ends of the kiln body member 12. The manifolds 64 and 64' are in fact interconnected either by appropriate design of the manifolds or alternatively by an exterior insulated piping system similar to that depicted by the pipe 23 in FIG. 1. As will be explained more fully hereafter, hot gas produced by the gasifier apparatus will be introduced into the manifold 65 from the collecting chamber 54 at hot output end 12B of the kiln body member 12 via input supply pipes 92 and 66, and has its highest temperature at this point in the system. The hot product feedback gas traverses backwardly through the system from manifold 65 in a direction counter to the flow of the biomass material being processed. The hot gas travels first through the feedback pipes 61 on fixed kiln body member 12 and to the manifold system comprised by manifold members 64 and 64' in which the hot feedback gas will be at substantially the same intermediate temperature lower than that at manifold 65. From manifolds 64', 64, the hot feedback gas passes through the tubular conduits 61 on fixed kiln body member 11 in a reverse counter flow direction to that of the biomass material to reach the cool output gas manifold 63 where it exits through an output pipe 92 substantially at ambient temperature after having most if not all its latent heat withdrawn during the feedback phase.

Figure 13:
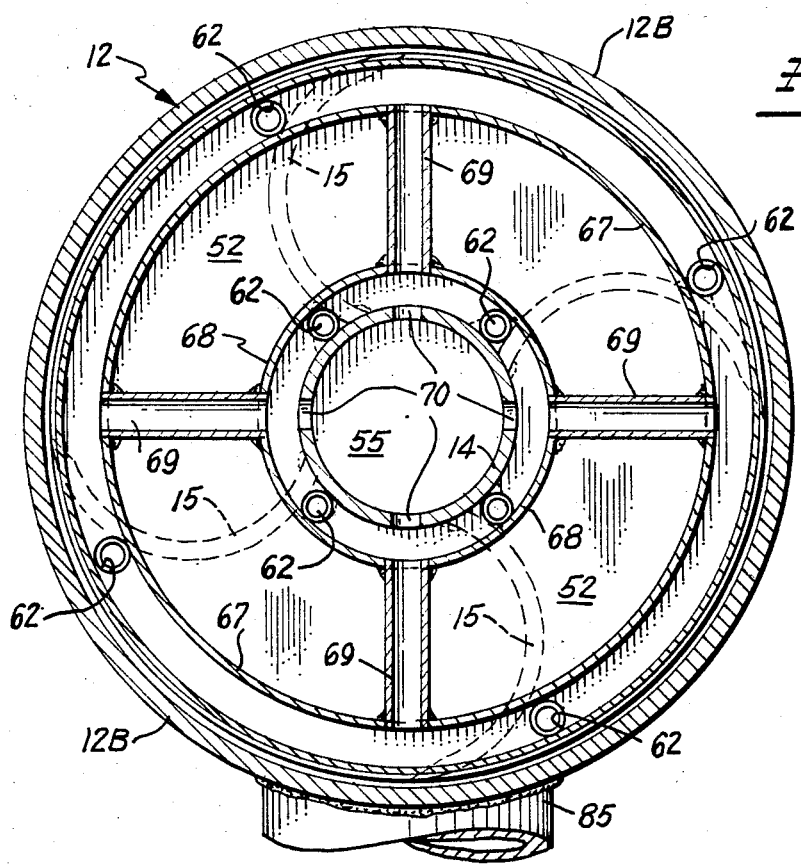
FIG. 13 is a cross sectional view taken through lines 13—13 of FIG. 2.

The hot gas feedback conduits 62 mounted on the convex back side of the scoop-like blade elements 15 are provided with separate manifold means best seen in FIG. 2, FIG. 12 and FIG. 13 of the drawings. The manifolds for supplying hot output product feedback gas through the rotor mounted tubular conduits 62 are comprised by two concentric ring manifold members 67 and 68 which are secured to the back side of the end flange 52 as shown in FIG. 2. A similar manifolding arrangement is provided at each end of the respective rotor shafts 14 of the fixed kiln body members 12 and 11. The concentric ring manifold members 67 and 68 are interconnected via spoke-like pipes 69 and each of the concentric ring manifold systems 67, 68, 69 are secured to and rotate with their respective end plates 52 on which they are mounted. As best shown in FIGS. 12 and 13, the open ends of the rotor mounted hot gas feedback tubes 62 are secured to respective openings formed in the end plates 52 so that hot output feedback gas can be supplied therethrough via the concentric ring manifold systems 67, 68 and 69.

Hot output feedback gas (or start-up steam) is introduced into the concentric ring manifold system 67, 68 and 69 secured to the hot output end 12B of the lower fixed kiln 12 via a supply pipe 92, hollow stub shaft 16 and a series of peripheral openings 70 formed in hollow shaft 14 which directly feed the interior or inner ring manifold 68. The hot output product feedback gas produced during operation of the apparatus and collected in chamber 54 is supplied from the collection chamber 54 back through the supply pipes 92 via valves 98, 96 and 95 and hollow stub shaft 16 to the hollow interior end of rotor 14 where it is fed to the inner ring manifold 68 via peripheral openings 70. A blank disc 55 secured in hollow rotor shaft 14 prevents the hot output gases from flowing through the inside of rotor shaft 14.

At the cooler end 12A of kiln 12, the hot feedback gas being supplied through the rotor mounted tubes 62 is collected in the ring manifold system 67, 68, 69 and supplied via peripheral openings 70 in the hollow open end of rotor shaft 14, hollow stub shaft 16 and an interconnecting insulating pipe 23 up to the ring manifold system 67, 68, 69 on the hot end 11B of kiln 11. From here the feedback gas flows through the rotor mounted feedback tubes 62 in kiln 11 to the cool inlet end 11A. At inlet end 11A, the feedback gas supplied through rotor mounted tubes 62 is at ambient temperature and is collected in the ring manifold system 67, 68 and 69 and supplied through peripheral openings 70 to the open end of shaft 14, hollow stub shaft 16 and supply pipe 92 via valve 101 to the output product gas supply pipe 90. In supply pipe 90 the gas mixes with output gas being fedback via the fixed kiln body member mounted pipes 61 and supplied to an end user of the gas. At this point the output product gas will have given up all of its latent heat and will be at substantially ambient temperature. It will be appreciated; however, that substantially all of the latent heat required to extract the output gas from the biomass from which the gas was derived, will be given up during feedback in raising the temperature of fresh incoming biomass material being processed. This phenomenon coupled with the exothermal nature of the biomass processing, results in a highly efficient system and method of gas production.

In a compound fixed kiln with rotor gasifier apparatus such as shown in FIGS. 1 and 2 of the drawings, the biomass material being processed by design will not be completely converted by the steam gasifier apparatus in the first barrel or kiln body member 11. Hence, at the output end of the first barrel or fixed kiln body member 11 there still will be a considerable amount of solid biomass material to be processed in the second barrel or fixed kiln 12. For this reason, the enlarged diameter interconnecting passageway 13 is provided. As the uncovered biomass material reaches the end of the first kiln body member 11 due to tumbling and gravitational action, it will exit kiln 11 through the interconnecting passageway 13 and be evenly deposited in the kiln cavity hollows between the scoop-like blade elements 15 of the rotor 14 of the second fixed kiln body member 12. Here again, the effect of the metering auger kiln supply of the biomass materials into the input end of the first kiln barrel 11 and the even transport provided to the material by the rotors 14, 15 of kiln 11 assures a continuous even supply of the unconverted material into the second stage kiln barrel 12 through the interconnecting passageway 13.

FIGS. 10 and 11 of the drawings illustrate the manner in which the hot gas feedback conduits 61 surrounding the exterior surface of the fixed kiln body members 11 and 12 are shaped to circumvent the interconnecting passageway 13 if the steam gasifier apparatus is constructed as a compound system such as shown in FIGS. 1 and 2. FIG. 10 of the drawings is a vertical sectional view taken through line 10—10 of FIG. 2. FIG. 11 is a transverse cross sectional view taken through lines 11—11 of FIG. 10 and looking down on the lower fixed kiln body member 12. In viewing FIGS. 10 and 11 it should be noted that all curvatures provided to the hot gas feedback conduits 61 are made as gradual as possible for reasons which will be apparent hereafter.

In order to further maximize transfer of heat from the feedback gas to the walls of the hot feedback gas pipes 61 and 62, it is desirable to avoid insofar as possible laminar flow of hot product feedback gases through the feedback conduit pipes 61 and 62. For this purpose, chain-like devices 71, best shown in FIGS. 4 and 5 of the drawings are inserted in the interior passageways of each hot gas feedback conduit 61 or 62. Within tubes 61 chains 71 extend for the full length thereof between the manifolds 63 and 64 in the case of upper kiln 11 or 64' and 65' in the case of the lower kiln 12. Within tubes 62 the chain-like devices extend between the respective pairs of concentric ring manifolds 67, 68 and 69 in both upper and lower kilns 11 and 12. The ends of the chain-like devices 71 are secured by suitable swivel fasteners, through-bolts or the like to the interior of the respective manifolds. The design of the manifolds 63, 64, 64' and 65' is such that their interiors readily can be accessed by removal of their outer peripheral surface plates so as to facilitate reciprocation and/or removal and replacement of the chains 71 for cleaning of the respective hot gas feedback pipes 61.

Access to the rotor mounted tubes 62 and the chain-like devices 71 supported therein via the end ring manifolds 67, 68 and 69 is not so easy as described above with respect to tubes 61 in that it requires removal of the end plates 17 to get at the concentric ring manifolds 67 and 68 to which the ends of chains 71 in tubes 62 are secured. After accessing their ends in the above manner, the chains 71 in both tubes 61 and 62 can be employed for cleaning purposes by reciprocating them back and forth within the tubes in a sawing-like action to facilitate clean-out of the tubes during periodic maintenance of the gasifier apparatus.

Accessing the chains 71 in feedback tubes 61 may require shutting down the apparatus for only part of a day to clean tubes 61 by reciprocation or removing and replacing chain-like devices 71. However, in order to access the chains in rotor mounted feedback tubes 62 requires a greater shut down period of the order of several days. This problem is alleviated considerably, however, by the fact that the chains within rotor mounted feedback tubes 62 are allowed to move somewhat during rotation by rotor 14, 15 so that chafing and scraping of the sides of the tubes 62 by chain-like devices 71 to provide self-cleaning occurs. Thus, the rate of build-up of deposits within more inaccessible feedback tubes 62 is considerably reduced in comparison to feedback tubes 61 whose chains are static and do not provide such dynamic self-cleaning action during operation of the gasifier apparatus.

For certain gasification processes, it may be desirable to employ catalysts such as nickel pellets 72 inserted within and held in place by the lengths of the chain-like devices 71. By their presence, the chains 71 will introduce turbulence in the hot gas feedback flow through pipes 61 and 62 thereby assuring better heat transfer to the sidewalls of the pipes 61 and 62 and hence through sidewalls of kiln body members 11 and 12 and/or the rotor blade elements 15 to the biomass material being processed. By withdrawing the chains and inserting the catalyst pellets 72 in place between the lengths of the chain and then returning the chain thus loaded with catalyst pellets, certain of the feedback pipes, or certain lengths of the passage of each feedback pipe 61 or 62, or a selected number of them can be provided with catalyst for effecting procedures such as polishing of the gas flowing through the pipes to thereby produce a better quality output gas with the apparatus.

An additional and important advantage provided by the scraping movement imparted to the chains 71 relative to the inner sidewalls of rotor mounted feedback tubes 62 as described above is that catalyst pellets 72 supported within the links of chain-like elements, as shown in FIGS. 4 and 5, are also caused to be scraped. This causes the surfaces of the catalyst to be scraped clean and polished continuously during operation of the gasifier apparatus. It is well known that only the surfaces of catalyst pellets such as 72 are effective in providing catalytic action such as in the nickel polishing of the steam refined gas being fedback through tubes 61 and 62. It also is known that during such processing, surface films tend to build up on the surfaces of the catalyst pellets 72 and reduce their effectiveness. The relative movement induced in the chains 72 within rotor mounted feedback tubes 62 causes continuous rubbing, chafing and scraping of the catalyst pellet surfaces thereby preventing to a considerable extent build-up of surface films. Thus the operating periods between required maintenance shut down for replacement of the catalyst pellets 72 in the more inaccessible rotor mounted feedback tubes 62 is significantly extended adding to the overall efficiency of operation of the steam gasifier apparatus made available by this invention.

One of the disadvantages of the classical tilted rotary kiln as a process tool (as opposed to a tilted fixed kiln with rotor) is the fact that it is essentially empty at the discharge end and the bed of materials being processed in such an apparatus is both narrow and shallow over a considerable portion of the length of the kiln. This same disadvantage could be present in the fixed tilted kiln with rotor as described in this application because its tumbling and transport characteristics are somewhat similar to those of the classical tilted rotory kiln. To overcome this potential disadvantage, dam-like baffle means shown at 81 in FIGS. 2 and 3 are mounted within the kiln body members 11 and 12 downstream from the input ends thereof. The dam-like baffle means 81 preferably comprise circular baffle plates having a plurality of circular openings 82 formed therein which are spaced about an inner circumference of the baffle dam 81 in alignment with the kiln cavity hollows defined by the spaces between the scoop-like blade elements 15 of the rotors 14, 15. The dam-like baffle 81 is secured to each rotor shaft 14 around its inner periphery and rotates with the rotor 14 and 15 in a manner such that the openings 82 in the dam-like baffle 81 always is in alignment with the kiln rotor cavity hollows. The openings 82 are designed such that there is a portion of baffle plate between the outer edges of the openings 82 and the inner circumferential surface of the kiln body members 11 or 12. As a consequence of this construction, a volume of biomass material being processed such as shown at 83 is built up in back of the dam-like baffle 81 in the same manner as a dam so as to greatly increase the volume of the bed of biomass contained within the tilted kiln with rotor as shown by the dotted line accumulation of material 83.

The improvement in bed volume provided by the tilted fixed kiln with rotor can be calculated by a complex equation, however for the sake of simplicity it will not be developed in this disclosure. Briefly, however, a baffle dam having the characteristics described above and shown in the drawings would increase the bed volume of biomass being processed by about 65%, the area of the heated surface in contact with the biomass would be increased by about 35%, and through-put of the apparatus would be increased by 50%. Thus, a tilted fixed kiln with rotor gasifier apparatus constructed according to the invention as thus far described and designed for about 200 tons per day processing of biomass material would have its through-put increased to about 300 tons per day by the addition of the dam-like baffle in the manner described above. Thus, it will be appreciated that the additional biomass material being processed held by the dam can be translated either into a longer dwell time or a higher through-put. This feature provides a very nice gain in gasifier output for a very small cost increase in the design and construction of the gasifier apparatus.

It is anticipated that the steam gasification of biomass material conducted with the apparatus of the invention will be effective with respect to certain biomass material to completely convert the biomass to gas at the hot output gas end collection chamber 54 of the two stage apparatus illustrated in FIGS. 1 and 2. With most biomass material to be processed by the improved gasifier apparatus, the gasification process will be about 98–99% efficient so that only a small amount of solid residue appears at the output end of the second stage kiln body member 12. This solid residue is allowed to tumble into a solids outlet conduit 85 where it is accumulated. Upon a sufficient accumulation of solid residue being built up in the solids outlet conduit 85, a first stop valve 86 secured to the lower end of conduit 85 is opened, allowing the accumulated charge of solid residue to be discharged into a lower outlet conduit 87 whose lower end is closed by a second stop valve 88. The first stop valve 86 in the upper outlet conduit then is closed and the lower output stop valve 88 opened to thereby allow the accumulated solid residue to be discharged into a collection pan shown at 89. The residue thus accumulated is rich in potash and lime and can be used like wood ash as fertilizer.

In order to provide a means for initial start-up of a processing run with the improved steam gasifier apparatus, a start-up auxiliary steam boiler shown at 91 is provided and is of conventional, commercially available construction for providing high temperature and high pressure steam in the temperature and pressure ranges for which the gasifier apparatus is designed to operate. The start-up auxiliary steam boiler 91 is interconnected with the steam gasifier apparatus through a plurality of steam supply pipes 92, a condensate return and makeup water supply pipe 93, and a product gas output pipe 90. This interconnected piping system is also provided with a plurality of cutoff valves indicated at 94–98 in the steam supply piping system, 99 and 101 in the condensate return piping system, 102 in the makeup water piping system and 103 and 104 in the output product gas piping system which also includes 101. As noted above, fuel for the start-up auxiliary steam boiler 91 can be provided by tapping off and storing until needed a certain amount of the output product gas produced by the steam gasifier apparatus either separately or in combination with biomass feed stock which has been allowed to air dry to the point where it is a suitable solid fuel.

In order to initially place the steam gasifier apparatus in operation, the output product gas stop valves 103 and 104 shown in FIG. 1 are closed. Assuming that the start-up auxiliary steam boiler is up to temperature and pressure, then the steam supply valves 94, 95, 96 and 97 are opened and the steam system stop valve 98 closed. Under these conditions, the condensate return valves 101 and 99 are open and the makeup water valve 102 closed after it has been assured that there is adequate water supply in the start-up auxiliary boiler. Under these conditions, high temperature/high pressure steam will be supplied through the stop valves 94 and 95 to the inlet end of the concentric ring manifold 67, 68, 69 provided at the hot gas output end 12B of lower kiln 12 via supply pipe 92 and hollow stub shaft 16 and thence through the rotor mounted hot gas feedback tubes 62 of lower kiln 12 and interconnecting piping 23 to the rotor mounted hot gas feedback tubes 62 of the upper kiln member 11. High temperature, high pressure steam from auxiliary boiler 91 also will be supplied through the supply valves 94, 96 and 97 to the manifold 65 at the hot output end of the lower kiln member 12. From manifold 65, the high temperature/high pressure stream travels through the parallel hot gas feedback tubes 61 secured around the lower kiln 12 as described above to the intermediate manifold arrangement 64, 64' and thence back through the hot gas feedback tubular conduits 61 of the upper first kiln member 11 to the product gas output manifold 63. Upon reaching the ring manifold system 67, 68 and 69 at the inlet end of 11A of upper kiln 11 and/or the manifold 63, the steam will have given up all of its latent heat and will be reduced to condensate for return back to the start-up auxiliary steam boiler 91 via the condensate return piping system 93 and stop valves 101, 103 and 99.

In transiting the above described closed system, the kiln body members 11 and 12 will be gradually brought up to temperature and pressure over a period of about eight (8) hours by the high temperature and high pressure steam thus applied from auxiliary start-up boiler 91. This results in producing a temperature profile over the length of the gasifier apparatus such that manifold 65 of the lower kiln 12 will be at the hottest point in the system, and the gas/condensate outlet manifold 63 at the (gas) outlet end 11A (which corresponds to the inlet end for biomass material being processed) of the upper first kiln 11 will be at the coolest point in the system. It will be appreciated that if only a single tilted fixed kiln body member such as 11 is employed, then the hottest point in the system would be at the outlet end 11B of the single kiln member as opposed to an intermediate temperature which occurs with a two stage dual kiln member system as illustrated in FIG. 1. It should be further appreciated that if additional fixed kiln with rotor stages are required, they can be simply added on to extend the required additional number of serially connected tilted, fixed kiln with rotor body members such as 11 and 12 in the system. If thus modified, the last kiln member in the system will have its kiln outlet end (corresponding to end 12B) at the highest temperature in the temperature profile of the overall system.

With the gasifier apparatus conditioned in the manner described in the preceeding paragraph, biomass material to be steam gasified continuously is introduced through the input metering auger feed system 31–44 as described earlier in this specification. It should be appreciated that the biomass material being processed must have a sufficient moisture content that it can produce within the kiln body members 11 and 12 all of the steam required for steam gasification of the biomass material. In the case of solid waste and wood chips it is anticipated that such biomass material will in and of itself have all the moisture content required. However, with respect to coal in the as-mined condition, it is quite likely that water will have to be added to the coal to provide it with adequate moisture content to produce the steam required in carrying out the steam gasification process.

During the initial stages of its travel through the upper kiln 11, the biomass will be dried. This drying phase will be at a temperature of about 100 to 500 degrees Fahrenheit and will extend usually from about one third to one half of the total length of the gasifier system. If the biomass material is very wet (such as certain types of solid waste), then the drying phase may occupy the entire length of the first kiln member 11 which amounts to one half the length of the total system shown in FIGS. 1 and 2.

The drying phase is then followed by pyrolysis of the biomass material. This involves the thermal decomposition of the pyrolyzable biomass material in an oxygen starved atmosphere and results in the production of:

(1) gas
(2) volatile liquids, and
(3) char.

Here again if the biomass material being processed is of average wetness such as wood chips, sawdust and the like as well as most solid waste, then about a third of the total system length would be occupied with the pyrolysis phase within a temperature range of about 400 to 900 degrees Fahrenheit. If the input biomass material supplied to the apparatus is very wet, then the ratio might very well change to one where half of the total system length is occupied with drying of the biomass with one quarter required for pyrolysis and the remaining quarter required for steam reforming as described hereafter.

The third gasification stage is that of steam reforming at high temperature which occupies the last one third or one quarter of the total system length and extends over a temperature range of about 600 to 1000 degrees Fahrenheit. In this phase, volatile liquids resulting from the pyrolysis phase are steam reformed into gas. This is a well known process and has been described in a number of textbooks and published technical papers. Concurrently with the steam reforming of the volatile liquids, steam gasification of any char resulting from the pyrolysis phase produces additional gas so as to leave only about 2% solid residue which by itself may be useful. The solid residue or char is collected as described above by dropping it into the solid output conduit 85 and collector 89. The resultant gas produced by the above briefly described steam gasification process will be at a very high temperature comparable to the initial high temperature of the steam introduced into the gasifier apparatus by the start-up auxiliary boiler 91 (i.e. 1000–1100 degrees Fahrenheit).

After the steam gasification apparatus has been operated in the above described manner, it will slowly build up in pressure to the desired operating pressure range of from 200–400 psi gauge over a period of about eight (8) hours. This high pressure will be essentially uniform throughout the entire kiln system with a pressure drop of less than one percent (1%) from the low temperature biomass input end to the high temperature gas output end of the kiln member 11 and 12. With respect, however, to the pressure of the hot gases in the hot gas feedback tube system there will be a pressure gradient through the hot gas feedback tubes 61, 62 of five to ten percent (5%–10%) from the hot end to the cool end. At this point the steam gasification apparatus is conditioned for self-operation or partial self-operation dependent upon whether the input biomass material is sufficiently exothermic in the pyrolysis and gasification by steam reforming phases of its processing. That is to say that during the pyrolysis phase and the gasification by steam reforming phases, with certain biomass material which is highly exothermic in its nature, sufficient heat will be given off by biomass material during its processing, either as it is being pyrolyzed or steam reformed, or both, to make the entire process self-sustaining. This is not true of all biomass material. For example, most coal as it comes from the mine is not sufficiently exothermic during steam gasification so that a continuously operating steam gasification process using the apparatus would require modification of the concentric ring manifolds and the manifolds 63, 64, 64' and 65 so that at least a portion of the hot gas feedback tubes 61 and 62 are provided with make-up high pressure and high temperature steam supplied from the auxiliary make-up boiler 91. However, only a reduced level of make-up steam would be needed in comparison to that required during initial start-up. With respect to biomass material which is sufficiently exothermic in its characteristics, the steam gasification apparatus can be switched over as described hereafter to make the steam gasification system become both self-sustaining and substantially self-regulating.

Assuming that the biomass being processed is sufficiently exothermic and that the steam gasification apparatus has attained a desired temperature and pressure operating range as described briefly above, the system is switched over so as to isolate and cut out the auxiliary start-up boiler 91 and its condensate return piping system 9. This is achieved by closing down the steam supply stop valve 94 and the condensate return pipe 93 and stop valve 99 shown in FIG. 1. The stop valves 95 and 96 in the supply piping network 92 are left open and stop valves 97 and 98 also are opened. With reference to FIG. 2, it will be seen that the high temperature output gas chamber 54 at the high temperature gas output end of lower kiln member 12 communicates through a small peripheral opening provided around end plate 52 with the kiln cavity hollow between the scoop-like blade elements 15. Thus, hot output gas produced during the steam reforming phase within kiln 12 is supplied to the chamber 54 and in turn fed to the manifold means comprised by 63 and concentric ring manifolds 67, 68 and 69 at the hot gas output end of lower kiln 12. From here part of the hot product output gas travels through rotor mounted feedback tubes 62 of lower kiln 12, through interconnecting passage 23 and thereafter through the rotor mounted tubes 62 of upper kiln 11. This feedback of the hot output product gas through the rotor mounted hot gas feedback tubes 62 partially maintains the high temperature profile existing in kilns 11 and 12 originally introduced by the high temperature/high pressure steam supplied from the auxiliary start-up boiler.

The remaining hot output product gas is supplied from the hot gas collection chamber 54 via the supply pipe 92, and open supply valves 98 and 97 back to the hot output product gas manifold 65. The hot output product gas thus supplied to the manifold 65 will then be fed back through the fixed hot gas feedback conduit pipes 61 on the exterior of kilns 12 and 11 in a counter flow direction to the input biomass material being processed. This, together with the hot product gas heating provided through the feedback path via rotor mounted hot gas feedback tubes 62, and the exothermic decomposition of the biomass material being processed in either one or both the pyrolysis and steam gasification phases, serves to maintain both the lower and upper kilns 12 and 11 at their respective operating temperature and pressure gradients consistent with a self-operating and self-regulating condition.

In order to assure that this desired self-operating and self-regulating condition is set up and running, while initially switching over from the start-up of the steam gasification apparatus using high temperature/high pressure steam from the start-up auxiliary boiler 91, some regulation of the pressure and temperature conditions within the kiln body members 11 and 12 must be provided by suitable regulation or throttling of the product hot output gases supplied through the valves 95, 96, 97 and 98 and by regulating the flow of cool product output gas through valves 101, 103 and 104. By appropriate adjustments to these valves, the initial operating condition originally imposed through the use of the make-up steam supplied from the make-up auxiliary boiler 91 can be maintained through the feedback counter flow of the hot output product gases used in conjunction with the exothermic heat provided by the biomass during thermal decomposition in the pyrolysis and steam gasification phases. When the steam gasifier apparatus is being used for the steam gasification of biomass materials which are not sufficiently exothermic in character, then it will be necessary to maintain the make-up steam auxiliary boiler 91 operating and to supply at least partial make-up steam to augment heat supplied to each of kilns 11 and 12 in addition to that provided by the feedback hot output product gas and any exothermic heat derived during pyrolysis and steam gasification of the biomass material being processed.

INDUSTRIAL APPLICABILITY

The invention described in this application provides an improved tilted, fixed kiln with rotor steam gasification apparatus for use in the steam gasification of biomass material such as solid waste, wood pulp, sawdust, wood chips, coal to which moisture is added and other similar biomass material which can be steam gasified under high temperature/high pressure conditions. The apparatus can be used as an efficient solid waste disposal unit capable of deriving output product gas which itself constitutes commercial grade low BTU fuel for use in boilers and other similar combustion equipment.

From the foregoing description it will be appreciated that the invention provides a new and improved, tilted, fixed kiln with rotor steam gasifier apparatus for the steam gasification of a wide range of biomass material and in which compaction and agglomoration of biomass material being processed is prevented. The improved apparatus provides means wherein turbulent hot output product gas feedback flow through gas feedback conduits built into the apparatus is induced and helps to maintain the apparatus in a self-operating and self-regulating condition as well as to maintain the feedback conduits clear with good thermal transfer characteristics and free of blockage and facilitates periodic mechanical clean out.

The improved apparatus further includes a novel metering auger feed device for feeding input biomass material to be processed into the input end of the gasifier apparatus in a manner such that compaction and agglomeration of biomass material at the input and throughout the steam gasifier is prevented. The provision of anti-agglomeration and stirring chains in the rotor kiln cavity hollows of the tilted kiln with rotor further provides assurance against agglomeration and incomplete steam gasification of the biomass material being processed. Through the addition of dam-like baffles for partially damming the flow of the biomass material through the gasifier apparatus, increasing dwell time of the biomass material being processed to assure complete gasification of the biomass material or increased through-put of the apparatus, can be obtained.

Having described a preferred embodiment of a novel tilted, fixed kiln with rotor steam gasifier apparatus constructed in accordance with the invention, it is believed obvious that changes may be made in the particular embodiment of the invention described which are within the full intended scope of the invention as defined by the appended claims.

What is claimed is:

1. A fixed kiln with rotor steam gasifier having a fixed elongated cylindrical, pressurizable kiln body member with an input end and an output end and with the center axis thereof supported at an angle relative to the horizontal so as to bring into effect gravitational forces acting on high moisture content biomass material fed into the input end and traveling to the output end, said fixed kiln with rotor gasifier including an axially extending rotor rotatably supported within the fixed kiln body member and means for rotating said rotor at a predetermined rotational speed, said rotor including radially spaced-apart scoop-like blade elements extending along the axial length of the kiln body member for tumbling the biomass material fed into the rotor kiln as it travels along the axial length of the fixed kiln body member from the input to the output end thereof, means for heating the interior of the fixed kiln body member to a high temperature with a continuously increasing temperature profile along its axial length from the input end to the output end, means for introducing biomass material into the input end of the kiln body member where it is acted upon by the rotor and a high temperature-high pressure steam atmosphere self-induced in the kiln body member, said scoop-like blade elements of the rotor being radially and axially arrayed relative to one another to define axially extending hollows between the radially spaced-apart blades for receiving and tumbling the biomass material fed into the input end of the kiln body member and at least one stirring and agitating chain-like device disposed in at least one of the hollows for further agitating and stirring the biomass material as it travels through the kiln body member to prevent the agglomeration and/or sticking of the material to the sides of the kiln or scoop-like blade elements.

2. A fixed kiln with rotor steam gasifier according to claim 1 wherein said means for heating the interior of the fixed kiln body member includes a plurality of substantially parallel, axially extending hot gas feedback tubular conduits arranged radially around the fixed kiln body member and manifold means for supplying hot steam refined output gas produced at the hot output end of the steam gasifier into the open ends of the hot gas feedback tubular conduits located at the hot output end of the gasifier to produce a feedback counterflow of the output hot gas back through said tubular conduits in a reverse direction relative to the travel of the biomass material through the gasifier.

3. A fixed kiln with rotor steam gasifier according to claim 1 wherein said means for heating the interior of the fixed kiln body member includes a plurality of rotor mounted, substantially parallel, axially extending hot gas feedback tubular conduits secured to the convex back side of the scoop-like blade elements and manifold means for supplying hot steam refined output gas produced at the hot output end of the steam gasifier into the open end of the hollow rotor shaft at the hot output end of the gasifier to produce a feedback counterflow of the output hot gas back through said rotor mounted hot gas feedback tubes in a reverse direction relative to the travel of the biomass material through the gasifier.

4. A fixed kiln with rotor steam gasifier according to claim 2 wherein said means for heating the interior of the fixed kiln body member further includes a plurality of rotor mounted, substantially parallel, axially extending hot gas feedback tubular conduits secured to the convex back side of the scoop-like blade elements and manifold means for supplying hot steam refined output gas produced at the hot output end of the steam gasifier into the open ends of all of the hot gas feedback tubular conduits at the hot output end of the gasifier to produce a feedback counterflow of the output hot gas back in a reverse direction relative to the travel of the biomass material through the gasifier apparatus.

5. A fixed kiln with rotor according to claim 4 wherein the fixed kiln body member is designed to operate in a pressure range of about 200 to 400 pounds per square inch gauge (psig) and in a temperature range of about 1100 to 1200 degrees Fahrenheit.

6. A fixed kiln with rotor steam gasifier according to claim 1 further including a start-up auxiliary steam boiler capable of producing high temperature/high pressure steam, a network of steam pipes interconnecting the outlet steam from the start-up auxiliary steam boiler to the high temperature outlet end of the fixed kiln body member for initially bringing the kiln body member up to temperature and pressure and starting the gasifier process with respect to an initial charge of biomass material supplied thereto, said network of steam pipes also including product output gas piping and condensate return piping connected to the cool inlet end of the fixed kiln body member for supplying the product output gas produced by the gasifier to an end user and for feeding condensate back to the auxiliary steam boiler together with any make-up water required, and appropriate cut-off and flow control valve means interconnected in said network of steam, output product gas and condensate return pipes.

7. A fixed kiln with rotor steam gasifier according to claim 5 further including a start-up auxiliary steam boiler capable of producing high temperature/high pressure steam, a network of steam pipes interconnecting the outlet steam from the start-up auxiliary steam boiler to the high temperature outlet end of the fixed kiln body member for initially bringing the kiln body member up to temperature and pressure and starting the gasifier process with respect to an initial charge of biomass material supplied thereto, said network of steam pipes also including product output gas piping and condensate return piping connected to the cool inlet end of the fixed kiln body member for supplying the product output gas produced by the gasifier to an end user and for feeding condensate back to the auxiliary steam boiler together with any make-up water required, and appropriate cut-off and flow control valve means interconnected in said network of steam, output product gas and condensate return pipes.

8. A fixed kiln with rotor steam gasifier system comprised by a plurality of individual fixed kiln with rotor gasifiers according to claim 1 connected in series, the hot output end of each individual fixed elongated cylindrical, pressurizable kiln body member being connected through a substantial open interconnecting passageway communicating with the cool input end of the next succeeding kiln body member in the system so that all of the kiln body members and interconnecting passageways operate at substantially the same pressure and within the continuously increasing temperature profile extending over the length of the entire system of serially connected kiln body members whereby the input end of the first kiln body member is the coolest point and the output end of the last kiln body mermber is at the hottest point in the temperature profile of the gasifier system thus comprised.

9. A fixed kiln with rotor steam gasifier system comprised by a plurality of individual fixed kiln with rotor gasifiers according to claim 7 connected in series, the hot output end of each individual fixed elongated cylindrical, pressurizable kiln body member being connected through a substantial open interconnecting passageway communicating with the cool input end of the next succeeding kiln body member in the system so that all of the kiln body members and interconnecting passageways operate at substantially the same pressure and within the continuously increasing temperature profile extending over the length of the entire system of serially connected kiln body members whereby the input end of the first kiln body member is the coolest point and the output end of the last kiln body member is at the hottest point in the temperature profile of the gasifier system thus comprised.

10. A fixed kiln with rotor steam gasifier having a fixed elongated cylindrical, pressurizable kiln body member with an input end and an output end and with the center axis thereof supported at an angle relative to the horizontal so as to bring into effect gravitational forces acting on high moisture content biomass material fed into the input end and traveling to the output end, said fixed kiln with rotor gasifier including an axially extending rotor rotatably supported within the fixed kiln body member and means for rotating said rotor at a predetermined rotational speed, said rotor including radially spaced-apart scoop-like blade elements extending along the axial length of the kiln body member for tumbling the biomass material fed into the rotor kiln as it travels along the axial length of the fixed kiln body member from the input to the output end thereof, means for heating the interior of the fixed kiln body member to a high temperature with a continuously increasing temperature profile along its axial length from the input end to the output end, means for introducing biomass material into the input end of the kiln body member where it is acted upon by the rotor and a high temperature/high pressure steam atmosphere self-induced in the kiln boby member, said means for heating the interior of the fixed kiln body member including axially extending, parallel, hot gas feedback tubular conduit means radially arranged around the fixed kiln body member and the back side of the scoop-like blade elements of the rotor and manifold means for feeding back hot output gases produced by the steam gasifier through said hot gas feedback tubular conduits in a return counterflow direction to the movement of the biomass material, and chain-like elements extending along the axial length of the interior of at least some of the tubular hot gas feedback conduits for introducing turbulence in the flow of the hot feedback gases therethrough and thereby provide improved heat exchange characteristics thereto, to facilitate cleaning of the interior of the feedback conduits, and to hold in place catalyst pellets to be introduced into the hot output gases for conversion and cleaning purposes.

11. A fixed kiln with rotor steam gasifier according to claim 10 wherein said means for heating the interior of the fixed kiln body member includes axially extending hot gas feedback tubular conduit means arranged around the fixed kiln body member and the rotor for feeding back hot output gases produced by the steam gasifier in a return counterflow direction to the movement of the biomass material, and chain-like elements extending along the axial length of the interior of at least some of the feedback conduits for introducing turbulence in the flow of the hot feedback gases therethrough, to facilitate cleaning of the interior of the hot gas feedback conduits, and to hold in place catalyst pellets to be introduced into the hot output gases for conversion and cleaning purposes.

12. A fixed kiln with rotor steam gasifier according to claim 9 wherein said axially extending hot gas feedback tubular conduit means arranged around the fixed kiln body member and the rotor include chain-like elements extending along the axial length of the interior of at least some of the hot gas feedback conduits for introducing turbulence in the flow of the hot feedback gases therethrough and thereby provide improved heat exchange characteristics thereto, to facilitate cleaning of the interior of the feedback conduits, and to hold in place catalyst pellets to be introduced into the hot output gases for conversion and cleaning purposes.

13. A fixed kiln with rotor according to claim 12 wherein the fixed kiln body member is designed to operate in a pressure range of about 200 to 400 pounds per square inch gauge (psig) and in a temperature range of about 1100 to 1200 degrees Fahrenheit.

14. A fixed kiln with rotor steam gasifier according to claim 13 further including a start-up auxiliary steam boiler capable of producing high temperature/high pressure steam, a network of steam pipes interconnecting the outlet steam from the start-up auxiliary steam boiler to the high temperature outlet end of the fixed kiln body member for initially bringing the kiln body member up to temperature and pressure and starting the gasifier process with respect to an initial charge of biomass material supplied thereto, said network of steam pipes also including product output gas piping and condensate return piping connected to the cool inlet end of the fixed kiln body member for supplying the product output gas produced by the gasifier to an end user and for feeding condensate back to the auxiliary steam boiler together with any make-up water required, and appropriate cut-off and flow control valve means interconnected in said network of steam, output product gas and condensate return pipes.

15. A fixed kiln witn rotor steam gasifier system comprised by a plurality of individual fixed kiln with rotor gasifiers according to claim 14 connected in series, the hot output end of each individual fixed elongated cylindrical, pressurizable kiln body member being connected through a substantial open interconnecting passageway communicating with the cool input end of the next succeeding kiln body member in the system so that all of the kiln body members and interconnecting passageways operate at substantially the same pressure and within the continuously increasing temperature profile extending over the length of the entire system of serially connected kiln body members whereby the input end of the first kiln body member is the coolest point and the output end of the last kiln body member is at the hottest point in the temperature profile of the gasifier system thus comprised.

16. A fixed kiln with rotor steam gasifier having a fixed elongated cylindrical, pressurizable kiln body member with an input end and an output end and with the center axis thereof supported at an angle relative to the horizontal so as to bring into effect gravitational forces acting on high moisture content biomass material fed into the input end and traveling to the output end, said fixed kiln with rotor gasifier including an axially extending rotor rotatably supported within the fixed kiln body member and means for rotating said rotor at a predetermined rotational speed, said rotor including radially spaced-apart scoop-like blade elements extending along the axial length of the kiln body member for tumbling the biomass material fed into the rotor kiln as it travels along the axial length of the fixed kiln body member from the input to the output end thereof, means for heating the interior of the fixed kiln body member to a high temperature with a continuously increasing temperature profile along its axial length from the input end to the output end, means for introducing biomass material into the input end of the kiln body member where it is acted upon by the rotor and a high temperature-high pressure steam atmosphere self-induced in the kiln body member, and metering auger feed means mounted on the input end of said kiln body member with the metering auger having its axis of rotation disposed over the input end of said kiln body member for feeding input biomass material into the input end of said iln body member on a metered continuous basis whereby properly proportioned spacing of the biomass material in the hollows between the spaced-apart scoop-like blade elements of the rotor is assured and agglomeration of the biomass material at the input and throughout the kiln is prevented.

17. A fixed kiln with rotor steam gasifier according to claim 1 further including metering auger feed means mounted on the input end of said kiln body member for feeding input biomass material into the input end of said kiln body member on a metered continuous basis whereby properly proportioned spacing of the biomass material in the hollows between the spaced-apart scoop-like blade elements of the rotor is assured and agglomeration of the biomass material at the input and throughout the kiln is prevented.

18. A fixed kiln with rotor steam gasifier according to claim 11 further including metering auger feed means mounted on the input end of said kiln body member for feeding input biomass material into the input end of said kiln body member on a metered continuous basis whereby properly proportioned spacing of the biomass material in the hollows between the spaced-apart scoop-like blade elements of the rotor is assured and agglomeration of the biomass material at the input and throughout the kiln is prevented.

19. A fixed kiln with rotor steam gasifier according to claim 12 further including metering auger feed means mounted on the input end of said kiln body member for feeding input biomass material into the input end of said kiln body member on a metered continuous basis whereby properly proportioned spacing of the biomass material in the hollows between the spaced-apart scoop-like blade elements of the rotor is assured and agglomeration of the biomass material at the input and throughout the kiln is prevented.

20. A fixed kiln with rotor steam gasifier according to claim 16 wherein said means for heating the interior of the fixed kiln body member includes a plurality of substantially parallel, axially extending hot gas feedback tubular conduits arranged radially around the fixed kiln body member and along the back side of the scoop-like blade elements of the rotor and manifold means for supplying hot steam refined output gas produced at the hot output end of the steam gasifier into the open ends of the hot gas feedback tubular conduits located at the hot output end of the gasifier to produce a feedback counterflow of the output hot gas back through said tubular conduits in a reverse direction relative to the travel of the biomass material through the gasifier and chain-like elements extending along the axial length of the interior of at least some of the hot gas feedback conduits for introducing turbulence in the flow of the hot feedback gases therethrough and thereby provide improved heat exchange characteristics thereto, to facilitate cleaning of the interior of the feedback conduits, and to hold in place catalyst pellets to be introduced into the hot output gases for conversion and cleaning purposes.

21. A fixed kiln with rotor according to claim 20 wherein the fixed kiln body member is designed to operate in a pressure range of about 200 to 400 pounds per square inch gauge (psig) and in a temperature range of about 1100 to 1200 degrees Fahrenheit.

22. A fixed kiln with rotor steam gasifier according to claim 21 further including a start-up auxiliary steam boiler capable of producing high temperature/high pressure steam, a network of steam pipes interconnecting the outlet steam from the start-up auxiliary steam boiler to the high temperature outlet end of the fixed kiln body member for initially bringing the kiln body member up to temperature and pressure and starting the gasifier process with respect to an initial charge of biomass material supplied thereto, said network of steam pipes also including product output gas piping and condensate return piping connected to the cool inlet end of the fixed kiln body member for supplying the product output gas produced by the gasifier to an end user and for feeding condensate back to the auxiliary steam boiler together with any make-up water required, and appropriate cut-off and flow control valve means interconnected in said network of steam, output product gas and condensate return pipes.

23. A fixed kiln with rotor steam gasifier system comprised by a plurality of individual fixed kiln with rotor gasifiers according to claim 22 connected in series, the hot output end of each individual fixed elongated cylindrical, pressurizable kiln body member being connected through a substantial open interconnecting passageway communicating with the cool input end of the next succeeding kiln body member in the system so that all of the kiln body members and interconnecting passageways operate at substantially the same pressure and within the continuously increasing temperature profile extending over the length of the entire system of serially connected kiln body members whereby the input end of the first kiln body member is the coolest point and the output end of the last kiln body member is at the hottest point in the temperature profile of the gasifier system thus comprised.

24. A fixed kiln with rotor steam gasifier having a fixed elongated cylindrical, pressurizable kiln body member with an input end and an output end and with the center axis thereof supported at an angle relative to the horizontal so as to bring into effect gravitational forces acting on high moisture content biomass material fed into the input end and traveling to the output end, said fixed kiln with rotor gasifier including an axially extending rotor rotatably supported within the fixed kiln body member and means for rotating said rotor at a predetermined rotational speed, said rotor including radially spaced-apart scoop-like blade elements extending along the axial length of the kiln body member for tumbling the biomass material fed into the rotor kiln as it travels along the axial length of the fixed kiln body member from the input to the output end thereof, means for heating the interior of the fixed kiln body member to a high temperature with a continuously increasing temperature profile along its axial length from the input end to the output end, means for introducing biomass material into the input end of the kiln body member where it is acted upon by the rotor and a high temperature-high pressure steam atmosphere self-induced in the kiln body member, and dam-like baffle means mounted within the kiln body member downstream from the input end thereof, said dam-like baffle means rotating with said rotor and having openings therein aligned with the kiln cavity forming hollows between the spaced-apart scoop-like blade elements of the rotor for passage of the biomass material through the kiln whereby the working volume of the biomass within the kiln is increased and results in either longer dwell time within the kiln or increased throughput.

25. A fixed kiln with rotor steam gasifier according to claim 1 further including dam-like baffle means mounted within the kiln body member downstream from the input end thereof, said dam-like baffle means rotating with said rotor and having openings therein aligned with the kiln cavity forming hollows between the spaced-apart scoop-like blade elements of the rotor for passage of the biomass material through the kiln whereby the working volume of the biomass within the kiln is increased and results in either longer dwell time within the kiln or increased throughput.

26. A fixed kiln with rotor steam gasifier according to claim 10 further including dam-like baffle means mounted within the kiln body member downstream from the input end thereof, said dam-like baffle means rotating with said rotor and having openings therein aligned with the kiln cavity forming hollows between the spaced-apart scoop-like blade elements of the rotor for passage of the biomass material through the kiln whereby the working volume of the biomass within the kiln is increased and results in either longer dwell time within the kiln or increased throughput.

27. A fixed kiln with rotor steam gasifier according to claim 16 further including dam-like baffle means mounted within the kiln body member downstream from the input end thereof, said dam-like baffle means rotating with said rotor and having openings therein aligned with the kiln cavity forming hollows between the spaced-apart scoop-like blade elements of the rotor for passage of the biomass material through the kiln whereby the working volume of the biomass within the kiln is increased and results in either longer dwell time within the kiln or increased throughput.

28. A fixed kiln with rotor steam gasifier according to claim 9 further including dam-like baffle means mounted within the kiln body member downstream from the input end thereof, said dam-like baffle means rotating with said rotor and having openings therein aligned with the kiln cavity forming hollows between the spaced-apart scoop-like blade elements of the rotor for passage of the biomass material through the kiln whereby the working volume of the biomass within the kiln is increased and results in either longer dwell time within the kiln or increased throughput.

29. A fixed kiln with rotor steam gasifier according to claim 12 further including dam-like baffle means mounted within the kiln body member downstream from the input end thereof, said dam-like baffle means rotating with said rotor and having openings therein aligned with the kiln cavity forming hollows between the spaced-apart scoop-like blade elements of the rotor for passage of the biomass material through the kiln whereby the working volume of the biomass within the kiln is increased and results in either longer dwell time within the kiln or increased throughput.

30. A fixed kiln with rotor steam gasifier according to claim 19 further including dam-like baffle means mounted within the kiln body member downstream from the input end thereof, said dam-like baffle means rotating with said rotor and having openings therein aligned with the kiln cavity forming hollows between the spaced-apart scoop-like blade elements of the rotor for passage of the biomass material through the kiln whereby the working volume of the biomass within the kiln is increased and results in either longer dwell time within the kiln or increased throughput.

31. A fixed kiln with rotor steam gasifier according to claim 24 wherein said means for heating the interior of the fixed kiln body member includes a plurality of substantially parallel, axially extending hot gas feedback tubular conduits arranged radially around the fixed kiln body member and along the back side of the scoop-like blade elements of the rotor, manifold means for supplying hot steam refined output gas produced at the hot output end of the steam gasifier into the open ends of the hot gas feedback tubular conduits located at the hot output end of the gasifier to produce a feedback counterflow of the output hot gas back through said tubular conduits in a reverse direction relative to the travel of the biomass material through the gasifier, and chain-like elements extending along the axial length of the interior of at least some of the hot gas feedback conduits for introducing turbulence in the flow of the hot feedback gases therethrough and thereby provide improved heat exchange characteristics thereto, to facilitate cleaning of the interior of the feedback conduits, and to hold in place catalyst pellets to be introduced into the hot output gases for conversion and cleaning purposes.

32. A fixed kiln with rotor according to claim 31 wherein the fixed kiln body member is designed to operate in a pressure range of about 200 to 400 pounds per square inch gauge (psig) and in a temperature range of about 1100 to 1200 degrees Fahrenheit.

33. A fixed kiln with rotor steam gasifier according to claim 32 further including a start-up auxiliary steam boiler capable of producing high temperature/high pressure steam, a network of steam pipes interconnecting the outlet steam from the start-up auxiliary steam boiler to the high temperature outlet end of the fixed kiln body member for initially bringing the kiln body member up to temperature and pressure and starting the gasifier process with respect to an initial charge of biomass material supplied thereto, said network of steam pipes also including product output gas piping and condensate return piping connected to the cool inlet end of the fixed kiln body member for supplying the produce output gas produced by the gasifier to an end user and for feeding condensate back to the auxiliary steam boiler together with any make-up water required, and appropriate cut-off and flow control valve means interconnected in said network of steam, output product gas and condensate return pipes.

34. A fixed kiln with rotor steam gasifier system comprised by a plurality of individual fixed kiln with rotor gasifiers according to claim 33 connected in series, the hot output end of each individual fixed elongated cylindrical, pressurizable kiln body member being connected through a substantial open interconnecting passageway communicating with the cool input end of the next succeeding kiln body member in the system so that all of the kiln body members and interconnecting passageways operate at substantially the same pressure and within the continuously increasing temperature profile extending over the length of the entire system of serially connected kiln body members whereby the input end of the first kiln body member is the coolest point and the output end of the last kiln body member is at the hottest point in the temperature profile of the gasifier system thus comprised.

* * * * *